(12) United States Patent
Kang et al.

(10) Patent No.: US 8,233,445 B2
(45) Date of Patent: Jul. 31, 2012

(54) APPARATUS AND METHOD FOR DYNAMIC RESOURCE ALLOCATION IN BROADBAND WIRELESS COMMUNICATION SYSTEM

(75) Inventors: Hee-Won Kang, Seongnam-si (KR); Hoon Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 12/334,766

(22) Filed: Dec. 15, 2008

(65) Prior Publication Data
US 2009/0154418 A1    Jun. 18, 2009

(30) Foreign Application Priority Data
Dec. 17, 2007  (KR) .................. 10-2007-0132153

(51) Int. Cl.
*H04W 28/00* (2009.01)
(52) U.S. Cl. .................. 370/329; 370/338
(58) Field of Classification Search .......... 370/329, 370/338
See application file for complete search history.

(56) References Cited

U.S. PATENT DOCUMENTS

| | | | |
|---|---|---|---|
| 2008/0137597 A1* | 6/2008 | Lu ................... | 370/329 |
| 2008/0310528 A1* | 12/2008 | Soong et al. ................... | 375/260 |
| 2010/0177715 A1* | 7/2010 | Ofuji et al. .................... | 370/329 |
| 2010/0220683 A1* | 9/2010 | Novak et al. ................... | 370/330 |
| 2010/0246498 A1* | 9/2010 | Lim et al. ....................... | 370/329 |

OTHER PUBLICATIONS

TSG-C WG3, 'Group Resource Allocation Components Proposal', Dec. 2006, pp. 1-21.*

* cited by examiner

*Primary Examiner* — Melvin Marcelo
(74) *Attorney, Agent, or Firm* — Jefferson IP Law, LLP (57) ABSTRACT

An apparatus and method for dynamic resource allocation in a wireless communication system are provided. A method of operating a Base Station (BS) includes configuring a bitmap to indicate whether radio resources are allocated to respective Access Terminals (ATs) according to resource scheduling, generating a resource allocation message including at least one of the configured bitmap, bit allocation information of the bitmap, and bit deallocation information of the bitmap, and transmitting the resource allocation message.

21 Claims, 8 Drawing Sheets

APPARATUS AND METHOD FOR DYNAMIC RESOURCE ALLOCATION IN BROADBAND WIRELESS COMMUNICATION SYSTEM

PRIORITY

This application claims the benefit under 35 U.S.C. §119(a) of a Korean patent application filed in the Korean Intellectual Property Office on Dec. 17, 2007 and assigned Serial No. 10-2007-0132153, the entire disclosure of which is hereby incorporated by reference.

BACKGROUND OF THE INVENTION

1. Field of the Invention

The present invention relates to a broadband wireless communication system. More particularly, the present invention relates to an apparatus and method for dynamically allocating radio resources in a broadband wireless communication system.

2. Description of the Related Art

Next generation communication systems provide users with mobility and various services based on a Wireless Local Area Network (WLAN) or a Wireless Metropolitan Area Network (WMAN) at a high data transfer rate.

The communication system may use an Orthogonal Frequency Division Multiple Access (OFDMA) scheme. In the OFDMA scheme, data may be transmitted by dividing a frequency band to be used into several small frequency bands (i.e., subchannels and timeslots). That is, since a plurality of subchannels are used to transmit physical channel signals, data may be transmitted at a high speed. In addition, the OFDMA scheme is robust to frequency-selective fading.

When using the OFDMA scheme, a usage rate of radio resources may be increased according to a manner of distributing slots to Access Terminals (ATs). The slots are radio resources which are divided in a frame into subchannels and timeslots. The slot is a basic unit of resource allocation. A group of a plurality of consecutive slots may be defined as a radio resource for data burst allocation. In this case, a Base Station (BS) determines a manner of distributing the radio resources to the ATs in every frame, and informs the determination result to the ATs by using a resource allocation message (i.e., a MAP message).

A method of allocating bitmap resources is a technique for reducing overhead according to the resource allocation message. That is, when radio resources are dynamically allocated to a plurality of ATs, the BS matches the respective ATs to bits of a bitmap in a one-to-one manner. The bits of the bitmap are set to '0' or '1' to indicate whether the radio resources are allocated to the respective ATs. Since the BS uses a short-length bitmap format to identify the ATs allocated with the radio resources instead of using AT IDentifier (IDs), there may be an advantage in that more radio resources may be ensured for data communication.

Figure 1:
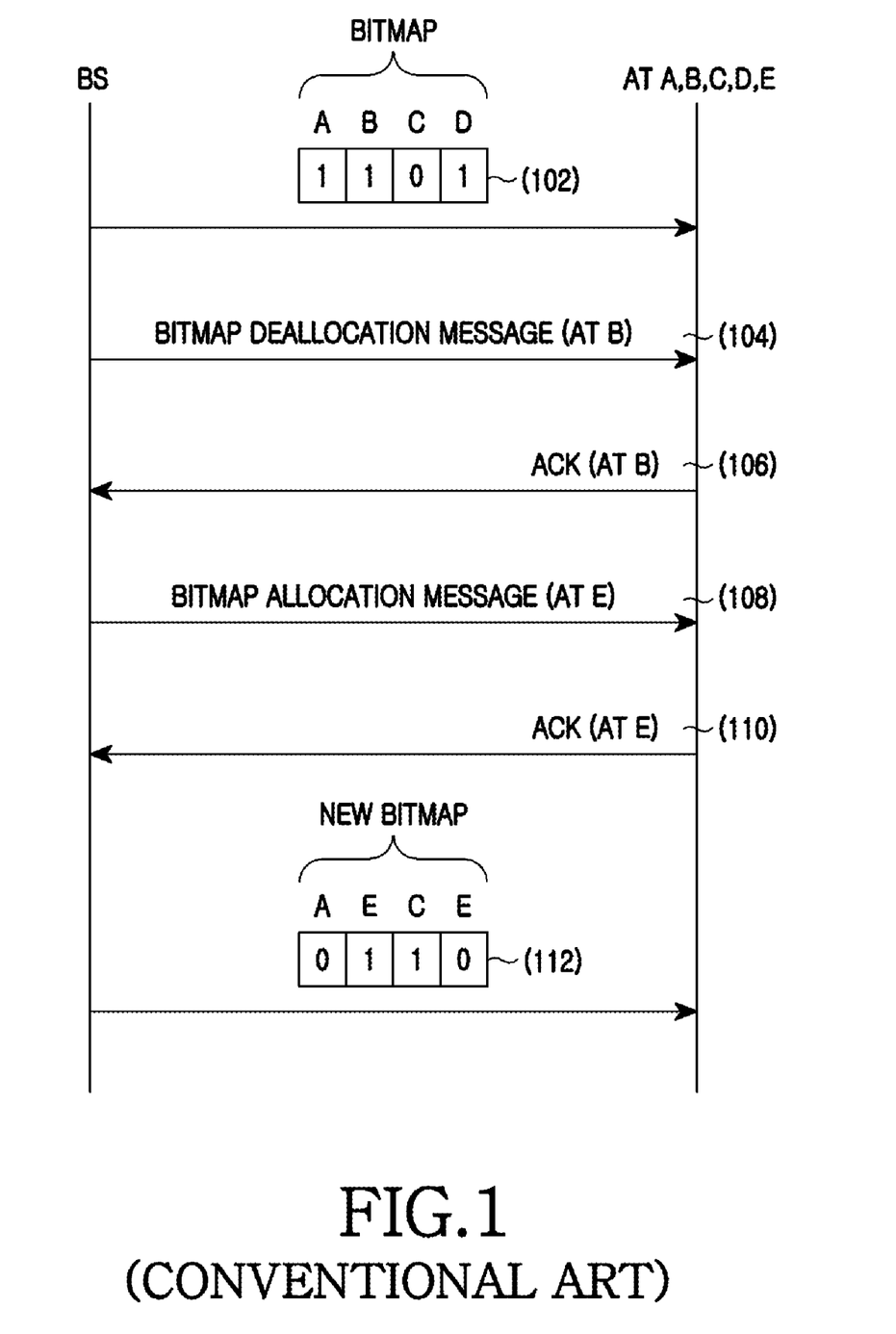
FIG. 1 illustrates a process of allocating and deallocating bitmap resources according to the conventional art.

FIG. 1 illustrates a conventional method of allocating and deallocating bitmap resources. Referring to FIG. 1, ATs A, B, C, and D respectively and sequentially correspond to bits of a bitmap. When radio resources are allocated to the ATs A, B, and D in step 102, the bitmap included in a resource allocation message may be expressed by '1101'. If the AT B no longer needs to be allocated with the bit of the bitmap and if a new AT E needs to be allocated with the bitmap, a bitmap deallocation message and a bitmap allocation message are transmitted respectively in steps 104 and 108 to the AT B and the AT E. A feedback signal (i.e., acknowledgement (ACK) or Negative ACK (NACK)) may then be received respectively in steps 106 and 110 from the AT B and the AT E. Thereafter, in step 112 a resource allocation message including a new bitmap expressed by '0110' may be transmitted. In the above described case, a unicast message may be used for bitmap allocation and deallocation, which leads to an increase in a waste of radio resources for bitmap management.

In other words, a method in which bit positions of a bitmap are informed to respective ATs by using separate messages in a unicast manner results in low efficiency when the bit positions are modified. In the method of allocating bitmap resources, a bit allocated to an AT for which resource allocation is no longer necessary may be immediately allocated to another AT in order to maintain a short-length bitmap. However, separate messages are used for bit allocation and deallocation of the bitmap and are transmitted in a unicast manner in the conventional method. Therefore, there may be a waste of radio resources that results from bitmap management.

SUMMARY OF THE INVENTION

An aspect of the present invention is to address at least the above-mentioned problems and/or disadvantages and to provide at least the advantages described below. Accordingly, an aspect of the present invention is to provide an apparatus and method for dynamically allocating radio resources to a plurality of Access Terminals (ATs) by using a bitmap in a wireless communication system.

Another aspect of the present invention is to provide an apparatus and method for reducing overhead resulting from changes in bit allocation of a bitmap when a bitmap allocation scheme is used for dynamically allocating radio resources in a wireless communication system.

Another aspect of the present invention is to provide an apparatus and method for maintaining and changing a bitmap corresponding to an AT when a bitmap resource allocation scheme is used in a wireless communication system.

Another aspect of the present invention is to provide an apparatus and method for determining a position of a bit corresponding to an AT in response to allocation and deallocation of bits of a bitmap when a bitmap resource allocation scheme is used in a wireless communication system.

In accordance with an aspect of the present invention, a method of operating a Base Station (BS) in a wireless communication system is provided. The method includes configuring a bitmap to indicate whether radio resources are allocated to respective ATs according to resource scheduling, generating a resource allocation message including at least one of the configured bitmap, bit allocation information of the bitmap, and bit deallocation information of the bitmap, and transmitting the resource allocation message.

In accordance with another aspect of the present invention, a method of operating an AT in a wireless communication system is provided. The method includes receiving a resource allocation message including at least one of a bitmap for indicating whether radio resources are allocated to respective ATs, bit allocation information of the bitmap, and bit deallocation information of the bitmap, analyzing the resource allocation message, and confirming a bit position for the AT in the bitmap included in the resource allocation message and determining whether to allocate the radio resources according to a setup value of the confirmed bit position.

In accordance with yet another aspect of the present invention, a BS apparatus for dynamic resource allocation in a wireless communication system is provided. The apparatus includes a resource allocator for allocating radio resources to respective ATs according to resource scheduling, a message generator for generating at least one of a bitmap for indicating whether the radio resources are allocated to the respective ATs, bit allocation information of the bitmap, and bit deallocation information of the bitmap, according to a result of the resource scheduling, and a transmitter for transmitting the resource allocation message.

In accordance with still another aspect of the present invention, an AT apparatus in a wireless communication system is provided. The apparatus includes a receiver for receiving a resource allocation message including at least one of a bitmap for indicating whether radio resources are allocated to respective ATs, bit allocation information of the bitmap, and bit deallocation information of the bitmap, and a controller for analyzing the resource allocation message to confirm a bit position for the AT in the bitmap included in the resource allocation message and for determining whether to allocate the radio resources according to a setup value of the confirmed bit position.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughput the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a technique for reducing overhead caused by signaling depending on resource allocation, deallocation, and change when resources are allocated using a bitmap in a wireless communication system will be described. Although an Orthogonal Frequency Division Multiplexing (OFDM)/ Orthogonal Frequency Division Multiple Access (OFDMA)- based broadband wireless communication system will be described as an example, the present invention also applies to other wireless communication systems using a resource allocation scheme similar to a bitmap resource allocation scheme.

Figure 2:
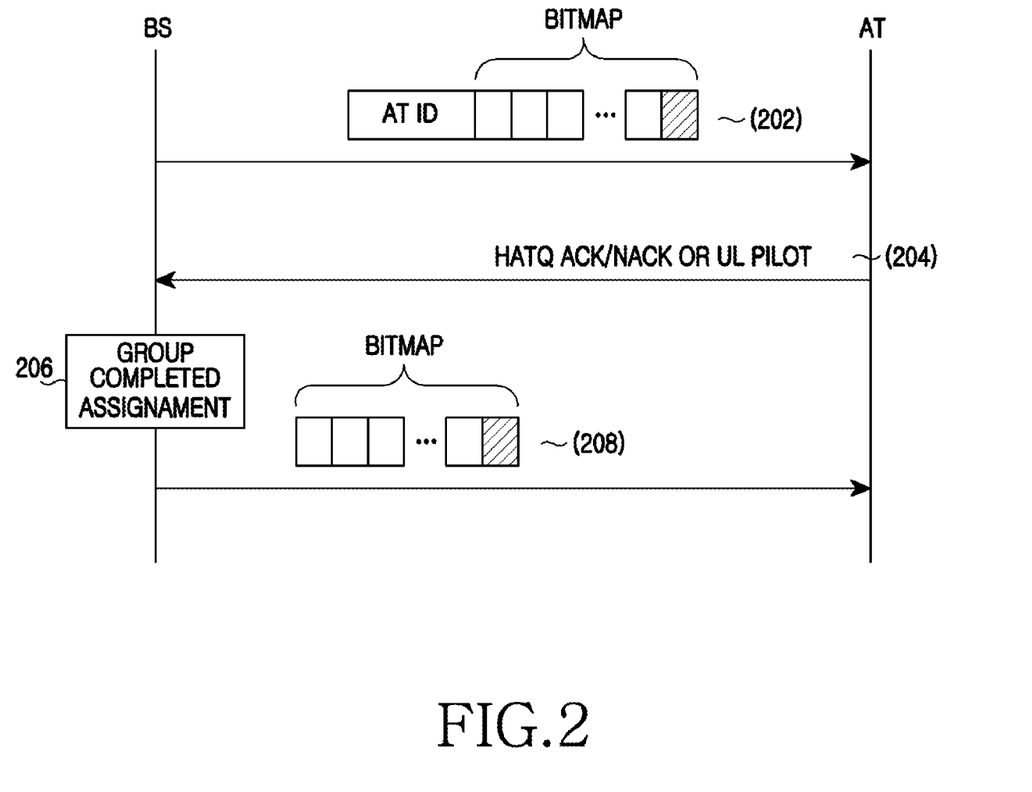
FIG. 2 illustrates a process of allocating bits of a bitmap according to an exemplary embodiment of the present invention.

FIG. 2 illustrates a process of allocating bits of a bitmap according to an exemplary embodiment of the present invention.

Referring to FIG. 2, a Base Station (BS) groups Access Terminals (ATs), each of which has the same feature, such as a Modulation and Coding Scheme (MCS) level or the like. Further, the BS allocates one bit (indicated by slashed boxes in FIG. 2) of the bitmap to the AT. That is, while allocating a radio resource to the AT, the BS allocates the bit of the bitmap by using a resource allocation message in step 202. In other words, in step 202 the BS transmits the resource allocation message by appending an AT IDentifier (ID) of the AT to the resource allocation message. Then, a last bit of the bitmap may be allocated to the AT, and this bit may be set to '1' to inform that the radio resource is allocated to the AT. Upon receiving the resource allocation message including the AT ID of the AT, the AT is informed that the last bit having a value of '1' is allocated to the AT. Then, the AT stores a corresponding bit position and a message sequence number. Since the bit allocated to the AT is '1', the AT recognizes that the radio resource is allocated to the AT, and thus performs communication by using the allocated radio resource.

When a bit of the bitmap is newly allocated to the AT, in a case of downlink burst allocation, the BS may determine in step 206 whether the bitmap is received by the AT by using a feedback of Hybrid Automatic Repeat reQuest (HARQ), that is, by using a feedback signal (i.e., acknowledgement (ACK) or Negative ACK (NACK) received from the AT in step 204. In a case of uplink burst allocation, the BS may determine in step 206 whether the bitmap is received by the AT by using a decoding result of the uplink burst or a reverse pilot channel received in step 204. If it is determined that the bitmap is not properly received, the BS reattempts allocation of the bit of the bitmap while reallocating the radio resource to the AT in step 208.

After group allocation is completed according to the process of FIG. 2, communication may be performed using a bitmap resource allocation scheme. The AT allocated with the bit performs communication by using the radio resource allocated to the AT. When a radio resource of a downlink channel is allocated, the AT receives data transmitted from the BS by using the allocated radio resource, and transmits ACK or NACK to the BS according to an error checking result of the received data. When a radio resource of an uplink channel is allocated, the AT transmits data to the BS by using the allocated radio resource. When no bit is allocated to the AT or when a bit having a value of '0' is allocated to the AT, no operation is performed since no radio resource is allocated to the AT.

Table 1 below shows an example of the resource allocation message.

When a radio resource is allocated, the BS transmits the resource allocation message by including the message SEQ number and the allocated bitmap to the resource allocation message. When a bit of the bitmap is allocated to an AT, the AT determines that the radio resource is allocated to the AT if the bit is '1' and determines that the radio resource is not allocated to the AT if the bit is '0'. The AT confirms a position of the bit allocated to the AT among bits having a value of '1' in the bitmap, and performs communication by using a radio resource corresponding to the position of the bit allocated to the AT according to a corresponding MCS level.

TABLE 1

One Example of a Resource Allocation Message

| Message Field | Description |
| --- | --- |
| message type | This field indicates a resource allocation message using a bitmap. |
| message sequence number | This field may be incremented by one when bit allocation of the bitmap changes. |
| radio resource position | A position of a radio resource to be allocated |
| the number of AT IDs | The number of IDs of ATs to which bits of the bitmap are newly allocated. If this value is greater than '0', a next field may be repeated by the number of IDs. |
| AT ID | An ID of an AT to which a bit of the bitmap may be allocated |
| bit allocation sequence number indicator | When a bit allocation sequence number is included, if the bit allocation sequence number is not '1', this indicator has a value of '0'. If the bit allocation sequence number is '1', two subsequent fields are included. |
| bit allocation sequence number | This field may be used in a process of reallocating the bits of the bitmap, and may be incremented by one in each process |
| bitmap bit start index | This field may be included when the number of AT IDs is greater than '0', and indicates a start position of bits allocated to ATs to which the bits of the bitmap are newly allocated. |
| bitmap length | The number of the bits of the bitmap to be used next |
| allocated bitmap | If a bit of the bitmap is '1', a radio resource may be allocated to the AT, and if the bit of the bitmap is '0', the radio resource may be not allocated to the AT. |
| MCS | This field may be repeated by the number of bits having a value '1' in a bitmap, and MCS levels are sequentially assigned to ATs allocated with bits having a value of '1'. |

When the BS allocates a radio resource to a new AT, the BS allocates a bit whose position is next to bits allocated up to now. Further, as shown in Table 1 above, the BS transmits the resource allocation message by including the AT ID of the AT to the resource allocation message. Upon receiving the resource allocation message, the AT recognizes that the bit of the bitmap is allocated to the AT since its AT ID is included in the message. Further, the AT determines one of last bits having a value of '1' among bits of the bitmap as its bit position according to an order of its AT ID among AT IDs included in the resource allocation message. For example, if the resource allocation message includes N AT IDs and if the AT ID of the AT may be an $M^{th}$ AT ID among the N AT IDs, an $M^{th}$ bit of the last N bits having a value of '1' in the bitmap included in the resource allocation message may be determined by the AT as the bit allocated to the AT.

In Table 1 above, the message SEQuence (SEQ) number may be used to inform the AT, allocated with the bit of the bitmap, that bit allocation of the bitmap has changed. First, if the bit of the current bitmap is allocated to the AT, the AT stores the message SEQ number at a time when the bit is allocated to the AT. Thereafter, if a new bit position is allocated using the resource allocation message, the message SEQ number may be incremented by '1' from a previous value. Then, the AT calculates its new bit position. If the message SEQ number is incremented in a situation where the new bit position is not allocated, the AT determines that the bit for the AT is deallocated.

If the bit of the bitmap allocated to the AT needs to be deallocated, that is, if a new bitmap needs to be configured, the BS includes a bit allocation sequence number (hereinafter, a New Bit Allocation Sequence (NBAS)) to the resource allocation message, and increments the NBAS by one whenever a bitmap allocation (or configuration) status changes. While counting the NBAS, ATs compare a previous bitmap and a current bitmap to calculate bit positions for the ATs in the new bitmap. However, if the bit of the bitmap needs to be deallocated, this is a case where the BS has determined that there is no longer a need to allocate a radio resource to a specific AT. Thus, in this process, the radio resource is not allocated to the specific AT. As a result, the bit of the bitmap constantly has a value of '0' for a time period when the NBAS is counted. If a new bitmap is configured, the BS transmits the resource allocation message including the configured new bitmap. In this case, the BS increments the message SEQ number included in the resource allocation message by one. If bits allocated to the ATs in the bitmap and included in the resource allocation message including the NBAS constantly have a value of '0', the ATs recognize bit deallocation only when the received message SEQ number is different from that known to the ATs.

When the bit of the bitmap allocated to the specific AT is deallocated, the new bitmap may be allocated as follows. If the NBAS included in the resource allocation message is '0', that is, if bit deallocation and bit allocation of the new bitmap are first achieved, the ATs whose bits have a value of '1' in the bitmap are sequentially allocated with bits of the bitmap according to an order of the bits having a value of '1'. If the NBAS included in the resource allocation message is incremented by one, among ATs whose bits of the bitmap included in the resource allocation message have a value of '1', ATs to which the bits of the new bitmap are not allocated in the previous step are sequentially allocated with the bits of the new bitmap. For this, if the NBAS included in the resource allocation message is '0', the AT stores the bitmap included in the resource allocation message together with the NBAS. If the received resource allocation message includes the NBAS which is incremented by one from the stored NBAS and if the bit allocated to the AT has a value of '0' in the bitmap included in the resource allocation message, the AT performs an OR operation between the bitmap included in the resource allocation message and the bitmap stored in the previous step, and then stores the operation result. In this case, the operation result indicates ATs to which the bits of the new bitmap are allocated up to now. The number of bits having a value of '1' in the obtained bitmap may be equal to the number of bits allocated in the new bitmap. Thereafter, if the received resource allocation message includes the NBAS which is incremented by one from the stored NBAS and if the bit allocated to the AT has a value of '1' in the bitmap included in the resource allocation message, the AT changes a bit having a value of '1' in the bitmap stored in the previous step into a bit having a value of '0' and changes a bit having a value of '0' in the bitmap into a bit having a value of '1'. The AT then obtains a result of an AND operation between the bitmap included in the resource allocation message and the obtained bitmap. The operation result indicates ATs to which bit allocation is performed using the current resource allocation message among ATs not allocated with the bits of the new bitmap in the previous step. The AT determines an order of its bit among bits having a value of '1' in the obtained bitmap. Then, by using the determined order, the AT calculates a position of a bit to be allocated to the AT in the new bitmap. For example, if N bits have a value of '1' in the stored bitmap until the previous resource allocation message is received and if an order of the bit allocated to the AT in the bitmap obtained through the AND operation corresponds to an $M^{th}$ bit among the bits having a value of '1', an $(N+M)^{th}$ bit may be determined as the bit to be allocated to the AT in the new bitmap to be used next.

Meanwhile, if the received resource allocation message has a NBAS which is not incremented by one from the NBAS included in the previously received resource allocation message, the AT determines that a bit allocation process for the new bitmap has failed. In this case, the BS attempts reallocation by allocating a new bit of the bitmap.

In addition, if the bit of the bitmap allocated to the AT is deallocated to allocate a bit of a new bitmap, the BS may determine whether the AT receives the resource allocation message as follows. In a case of a down channel, the BS determines that the AT has not received the resource allocation message if an HARQ feedback signal (i.e., ACK or NACK) is not received from the AT. In a case of an uplink channel, the BS determines that the AT has not received the resource allocation message if a transmit signal (e.g., a reverse pilot or data) is not delivered from the AT. In this case, the BS attempts reallocation of the bitmap.

In a process of deallocating the bit of the bitmap allocated to the AT, if a bit of a bitmap is allocated to a new AT, the BS informs the new AT of a bit position of the new bitmap by using a bitmap bit start index. That is, if the bit of the bitmap is allocated to the new AT, the BS transmits the resource allocation message by including the AT ID of the AT and a bit start index of the new bitmap in the resource allocation message. In this case, a last bit of the current bitmap may be allocated to the AT, and a bit indicated by a position of the bit start index may be allocated to the new bitmap to be used next. Upon receiving the resource allocation message, the AT recognizes that one bit of the current bit is allocated to the AT since its AT ID is included in the received message. Then, the AT determines one of last bits having a value of '1' among bits of the bitmap as its bit position allocated in the current bitmap according to an order of its AT ID among AT IDs included in the resource allocation message. Further, the AT determines a bit position calculated by adding the bit start index to the order of its AT ID as its bit position in the new bitmap. For example, assume that N AT IDs are included in the resource allocation message, an order of the AT ID of the AT corresponds to an $M^{th}$ order among the N AT IDs, and a bit start index value is L. In this case, the AT determines an $M^{th}$ bit among the last N bits having a value of '1' in the current bitmap included in the resource allocation message as a bit allocated to the AT, and determines an $(L+M)^{th}$ bit in the new bit to be used next as a bit allocated to the AT.

Figure 3:
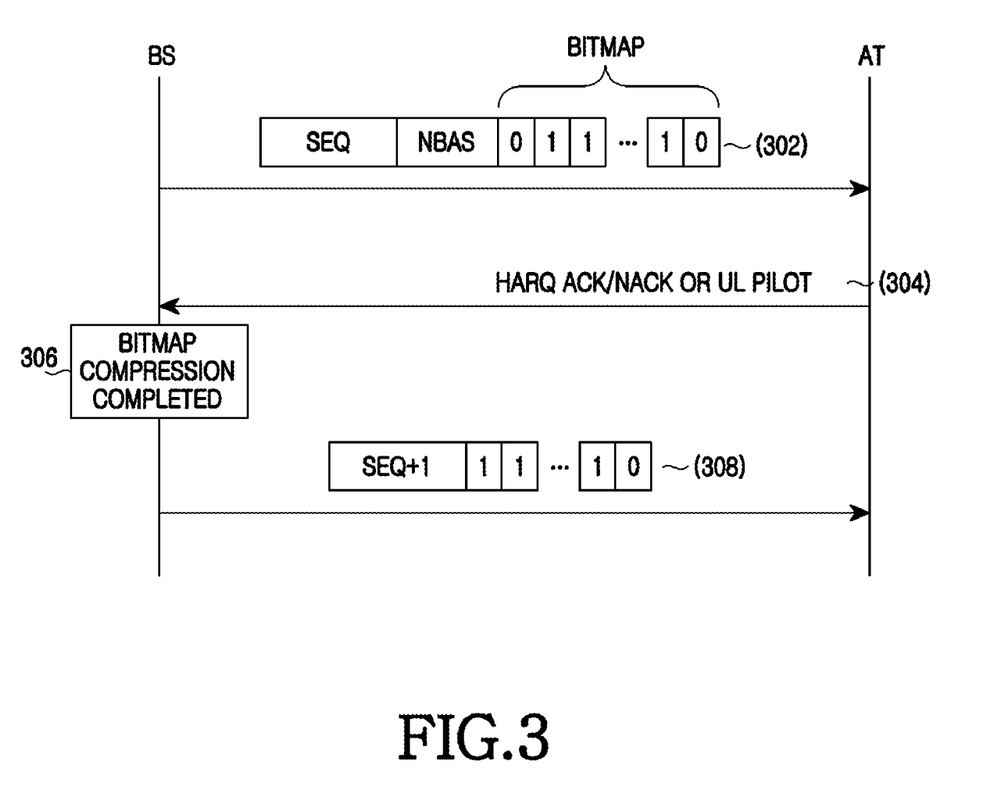
FIG. 3 illustrates a process of deallocating bits of a bitmap and allocating bits of a new bitmap according to an exemplary embodiment of the present invention.

FIG. 3 illustrates a process of deallocating bits of a bitmap and allocating bits of a new bitmap according to an exemplary embodiment of the present invention.

Referring to FIG. 3, the process of deallocating the bits of the bitmap starts when a BS transmits to an AT a resource allocation message including an NBAS in step 302. Allocation of the bits of the new bitmap may be achieved by setting the bits of the bitmap included in the resource allocation message to '1'. In a case of a downlink channel, upon receiving ACK or NACK from ATs whose bits are set to '1' in the bitmap in step 304, the BS determines that the ATs have successfully received the resource allocation message in step 306. Then, the BS increments a message SEQ number by one to inform that the new bitmap is used in step 308.

Figure 4:
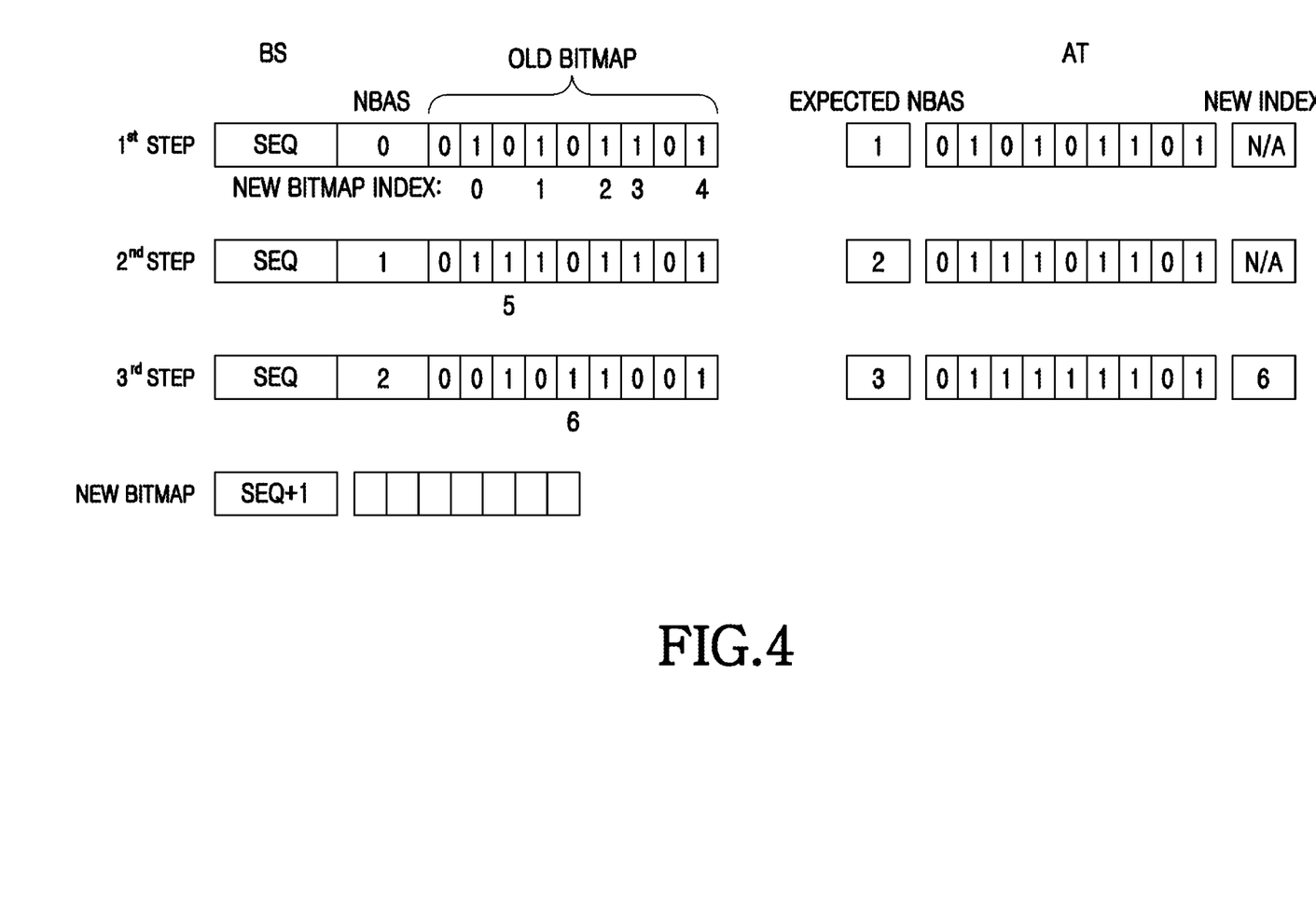
FIG. 4 illustrates a detailed example of calculating positions of bits allocated in a new bitmap according to an exemplary embodiment of the present invention.

FIG. 4 illustrates a detailed example of calculating positions of bits allocated in a new bitmap according to an exemplary embodiment of the present invention. In the example of FIG. 4, an AT allocated with a fifth bit (i.e., a bit index 4) of a bitmap calculates the positions of the allocated bits of the new bitmap. In FIG. 4, allocation of the new bitmap starts when a BS appends an NBAS to a resource allocation message. The NBAS may be '0' in the $1^{st}$ Step of FIG. 4. In this case, bits corresponding to index values 1, 3, 5, 6, and 8 in the bitmap included in the resource allocation message are set to '1'. ATs corresponding to these bits are allocated with bits indicated by index values 0, 1, 2, 3, and 4 of the new bitmap. Since a bit allocated to the AT is set to '0', the AT stores the NBAS and the received bitmap. The NBAS may be '1' in the $2^{nd}$ Step of FIG. 4. In this case, since the bit allocated to the AT is set to '0', the AT stores the NBAS and also stores the received bitmap by performing an OR operation with respect to the stored bitmap. The NBAS may be '2' in the $3^{rd}$ Step of FIG. 4. In this case, since the bit allocated to the AT is set to '1', the AT obtains the number of bits (i.e., 6) having a value '1' in the stored bitmap. Values '1' and '0' are reversed in the stored bitmap, and then an AND operation may be performed between the reversed bitmap and the received bitmap to obtain a resultant bit-stream '000010000' in which the bit for the AT is a first bit among bits having a value of '1'. Therefore, in the new bitmap, a $7^{th}$ bit (i.e., bit index 6) which may be obtained by adding one to the number of bits (i.e., 6) may be determined as a bit allocated to the AT.

Figure 5:
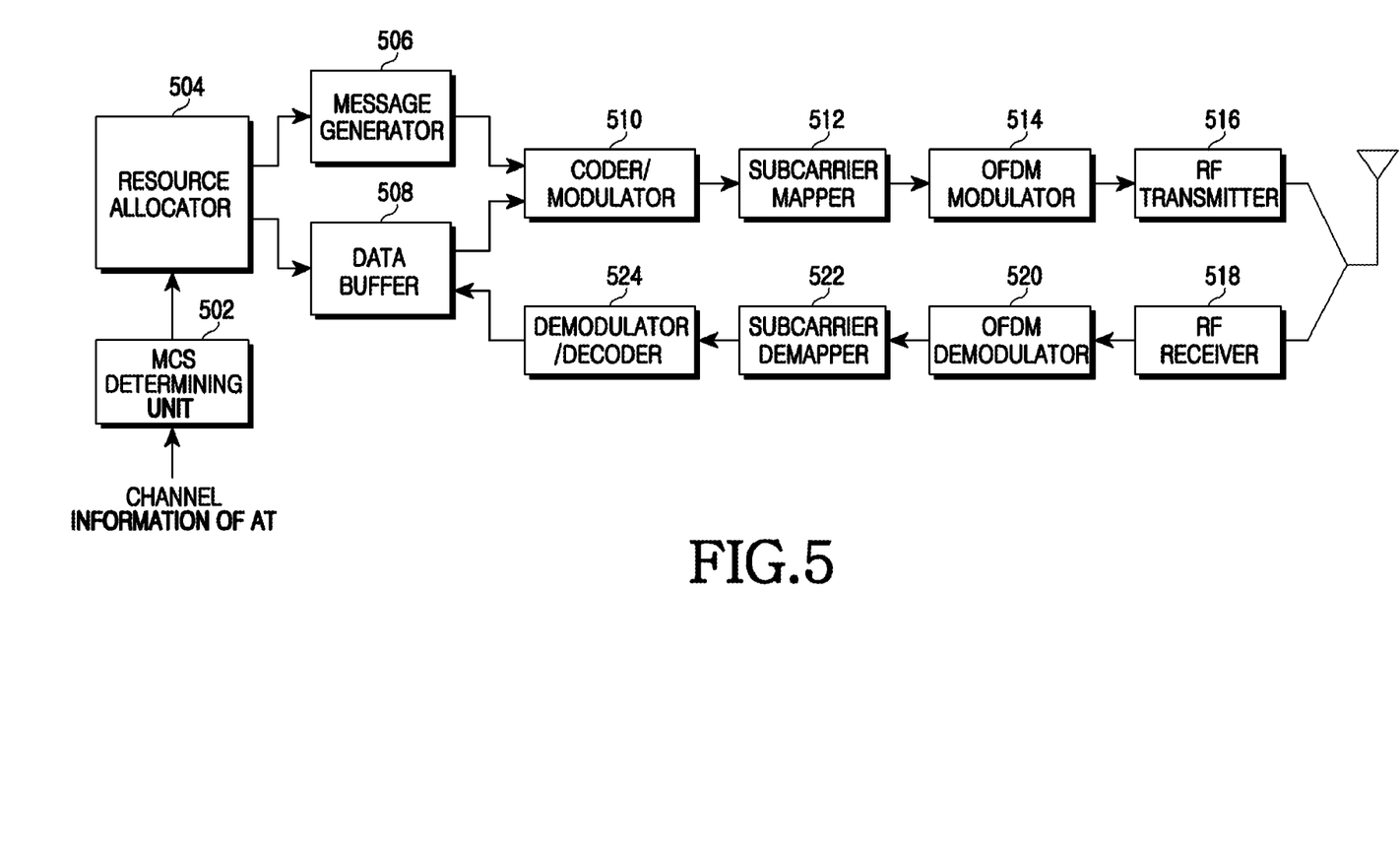
FIG. 5 illustrates a block diagram of a Base Station (BS) in a broadband wireless communication system according to an exemplary embodiment of the present invention.

FIG. 5 illustrates a block diagram of a BS in a broadband wireless communication system according to an exemplary embodiment of the present invention.

Referring to FIG. 5, the BS includes an MCS determining unit 502, a resource allocator 504, a message generator 506, a data buffer 508, a coder/modulator 510, a subcarrier mapper 512, an OFDM modulator 514, a Radio Frequency (RF) transmitter 516, an RF receiver 518, an OFDM demodulator 520, a subcarrier demapper 522, and a demodulator/decoder 524.

By using channel information of all ATs, the MCS determining unit 502 may determines an MCS level to be applied to each AT. Then, the MCS determining unit 502 may provide the determined MCS level to the resource allocator 504. Further, a determination on whether to receive ACK or NACK on a downlink channel for an AT and whether to receive a signal from the AT on an uplink channel for the AT may be provided to the resource allocator 504.

The resource allocator 504 may allocate a radio resource to each AT. In particular, according to an exemplary embodiment of the present invention, the resource allocator 504 may allocate radio resources to a plurality of ATs using a bitmap scheme, and may provide the allocation result to the message generator 506.

A function of resource allocation of the resource allocator 504 will be described below after explaining the respective functional blocks.

The message generator 506 may generate a Media Access Control (MAC) layer control message (e.g., a MAC management message) to be transmitted to the ATs. For example, the message generator 506 may generate a resource allocation message including the bitmap determined by the resource allocator 504.

The data buffer 508 may store data to be transmitted to the ATs, and may output the stored data according to the resource allocation result of the resource allocator 504.

The coder/modulator 510 may code and modulates a bit-stream provided from the message generator 506 and the data buffer 508. For example, the coder/modulator 510 may code and modulates data to be transmitted to each AT according to each AT's MCS level determined by the subcarrier mapper 512. The subcarrier mapper 512 may map the complex symbols provided from the coder/modulator 510 onto subcarriers according to the resource allocation result of the resource allocator 504. The OFDM modulator 514 may convert per-subcarrier signals provided from the subcarrier mapper 512 into time-domain signals by performing an Inverse Fast Fourier Transform (IFFT) operation, and may configure an OFDM symbol by inserting a Cyclic Prefix (CP). The RF transmitter 516 may up-convert a baseband signal provided from the OFDM modulator 514 into an RF signal, and may transmit the RF signal through an antenna.

The RF receiver 518 may down-convert the RF signal received through the antenna into a baseband signal. The OFDM demodulator 520 may divide a signal provided from the RF receiver 518 according to an OFDM symbol unit, may remove the CP, and may restore per-subcarrier signals by performing a Fast Fourier Transform (FFT) operation. The subcarrier demapper 522 may divide the per-subcarrier signals provided from the OFDM demodulator 520 according to a processing unit (e.g., a burst). The demodulator/decoder 524 may demodulate and decode signals provided from the subcarrier demapper 522 and thus may convert the signals into a bit-stream.

According to an exemplary embodiment of the present invention, the resource allocator 504 may determine a location of a resource allocation region in a frame, and may provide location information of the resource allocation region to the message generator 506. Further, the resource allocator 504 may one-dimensionally allocate radio resources within the resource allocation region to the ATs, and may specify the resources allocated to the ATs by using a bitmap.

When a bit of the bitmap is newly allocated or deallocated, the resource allocator 504 may provide the message generator 506 with an AT ID of an AT to which the bit is newly allocated, a position of the bit to be allocated in the bitmap, and an NBAS used in a deallocation process.

Accordingly, the message generator 506 may configure a bitmap by using a variety of information, and may generate the resource allocation message. As shown in Table 1 above, the resource allocation message may include the configured bitmap and the NBAS. Examples of the variety of information include radio resource location information provided from the resource allocator 504, an MCS level for a radio resource, an AT ID of an AT to which a bit is newly allocated, etc.

The coder/modulator 510 may code and modulate the resource allocation message according to, for example, a lowest MCS level among MCS levels of ATs that have to receive the resource allocation message. For another example, the resource allocation message may be coded and modulated according to a most robust MCS level. Subsequently, the resource allocation message may be transmitted via the subcarrier mapper 512, the OFDM modulator 514, and the RF transmitter 516.

After the radio resource is allocated according to the exemplary embodiment of the present invention, the data buffer 508 may output data to be transmitted by using the allocated radio resource. That is, when communication is performed on a downlink channel, the coder/modulator 510 may convert the data into complex symbols by performing coding and modulation according to a corresponding MCS level, and the subcarrier mapper 512 may transmit the complex symbols by mapping the complex symbols to the radio resource according to a resource allocation result. Meanwhile, when communication is performed on an uplink channel, the subcarrier demapper 522 may extract the complex symbols from the radio resource according to the resource allocation result, and the demodulator/decoder 524 may convert the complex symbols into a data bit-steam by performing demodulation and decoding according to a corresponding MCS level.

Figure 6:
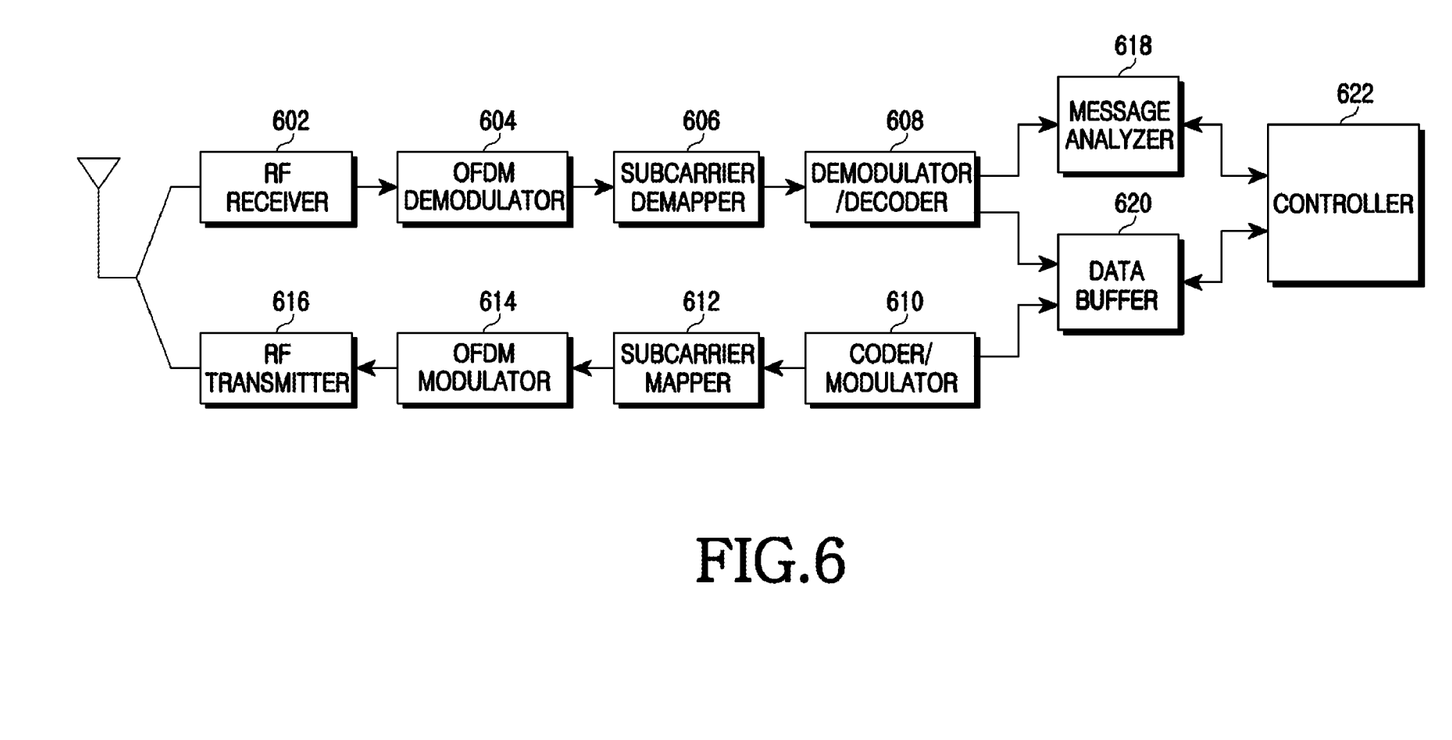
FIG. 6 is a block diagram of an Access Terminal (AT) in a broadband wireless communication system according to an exemplary embodiment of the present invention.

FIG. 6 is a block diagram of an AT in a broadband wireless communication system according to an exemplary embodiment of the present invention.

Referring to FIG. 6, the AT includes an RF receiver 602, an OFDM demodulator 604, a subcarrier demapper 606, a demodulator/decoder 608, a coder/modulator 610, a subcarrier mapper 612, an OFDM modulator 614, an RF transmitter 616, a message analyzer 618, a data buffer 620, and a controller 622.

The RF receiver 602 may down-convert an RF signal received through an antenna into a baseband signal. The OFDM demodulator 604 may divide the signal provided from the RF receiver 602 according to an OFDM symbol unit, remove a CP, and restore per-subcarrier signals by performing an FFT operation. The subcarrier demapper 606 may extract signals to be demodulated and decoded from the per-subcarrier signals provided from the OFDM demodulator 604. The demodulator/decoder 608 may convert the signals provided from the subcarrier demapper 606 into information bit-streams by performing demodulation and decoding.

The coder/modulator 610 may convert the information bit-streams provided from the data buffer 620 into complex symbols by performing coding and modulation. The subcarrier mapper 612 may map the complex symbols provided from the coder/modulator 610 onto subcarriers. The OFDM modulator 614 may convert the per-subcarrier signals provided from the subcarrier mapper 612 into time-domain signals by performing an IFFT operation, and then may configure OFDM symbols by inserting a CP. The RF transmitter 616 may upconvert the baseband signal provided from the OFDM modulator 614 into an RF signal, and may then transmit the RF signal through the antenna.

The message analyzer 618 may analyze a MAC layer control message received from the BS and may then provide the control message to the controller 622. For example, the message analyzer 618 may evaluate resource allocation information by analyzing a resource allocation message. A function of the message analyzer 618 according to the exemplary embodiment of the present invention will be described in detail after explaining the respective functional blocks.

The data buffer 620 may store data received from the BS and data to be transmitted to the BS, and may output the stored data to the coder/modulator 610 under the control of the controller 622.

The controller 622 may provide overall control for communication of the AT. For example, the controller 622 may provide control to perform communication by using a radio resource allocated according to the resource allocation information evaluated using the radio allocation message by the message analyzer 618. That is, the controller 622 may evaluate a radio resource allocated to the AT by using information provided from the message analyzer 618, and may control overall operations for communication by using the allocated radio resource.

According to the exemplary embodiment of the present invention, the message analyzer 618 may analyze the resource allocation message, evaluate specific information, and provide the evaluated information to the controller 622. The specific information may be at least one of radio resource location information (a bit position of a bitmap), an MCS level for a radio resource, an AT ID of an AT to be allocated with a new bit, a position of a bit to be allocated in a bitmap, and an NBAS. For example, the resource allocation message may include one or more of the aforementioned fields of Table 1 above.

According to an exemplary embodiment of the present invention, the controller 622 may operate as follows. First, the controller 622 may determine whether a message SEQ number is modified in the resource allocation message. If the message SEQ number is not modified, the controller 622 may evaluate a bitmap included in the resource allocation message to determine whether a corresponding bit is set to '1'. If the bit is set to '1', the controller 622 may determine that a radio resource is allocated. Meanwhile, if the AT ID of the AT is included in the resource allocation message, the controller 622 may calculate a bit position for the AT in the bitmap according to an order of the AT ID, and may determine that a radio resource corresponding to the calculated position is allocated. If a resource allocation message including an NBAS is received in a situation where the bit of the bitmap is allocated, the controller 622 may calculate a bit position of a new bitmap. Thereafter, upon receiving a resource allocation message including an incremented message SEQ number, the controller 622 may confirm a bit position of the new bitmap, and thereafter may perform communication by using the bit position of the new bitmap. During a time period of receiving the NBAS, if a corresponding bit value of a bitmap is constantly '0' and if a resource allocation message having an incremented message SEQ number is received thereafter, the controller 622 may determine that the radio resource of the AT is deallocated.

As such, when the radio resource is allocated, the controller 622 may obtain an MCS level corresponding to the allocated radio resource from the resource allocation message, and may control overall operations for communication by using the allocated radio resource. That is, the allocated radio resource may be evaluated as described above, if communication is performed through a downlink channel, the subcarrier demapper 606 extracts signals received using the radio resource evaluated by the controller 622, and the demodulator/decoder 608 converts the extracted signals into a data bit-stream by performing demodulation and decoding according to a corresponding MCS level. Otherwise, if communication is performed through an uplink channel, the data buffer 620 may output a data bit-stream to be transmitted under the control of the controller 622, and the coder/modulator 610 may convert the data bit-stream into signals by performing coding and modulation according to a corresponding MCS level. The subcarrier mapper 612 may map the signals onto the radio resources evaluated by the controller 622.

Figure 7:
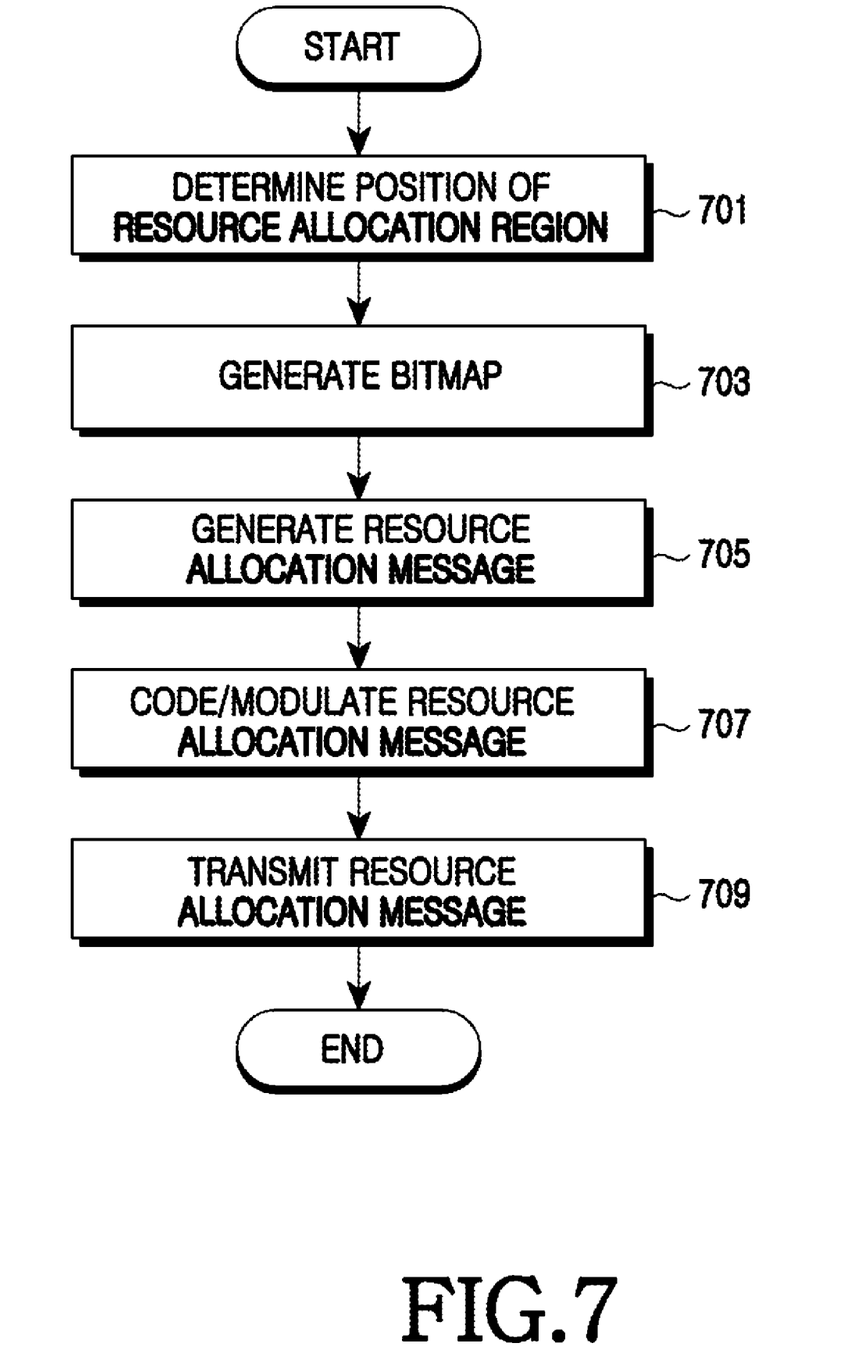
FIG. 7 is a flowchart illustrating an operation of a BS in a broadband wireless communication system according to an exemplary embodiment of the present invention.

FIG. 7 is a flowchart illustrating an operation of a BS in a broadband wireless communication system according to an exemplary embodiment of the present invention.

Referring to FIG. 7, the BS may allocate radio resources in a frame to ATs by performing scheduling in step 701. Herein, the radio resources may be allocated to the respective ATs according to a bitmap.

After the scheduling is completed, the BS may generate a bitmap according to the scheduling result in step 703. Each bit position of the bitmap may be one-to-one mapped to a corresponding AT. If a radio resource is allocated to the AT as a result of scheduling, a corresponding bit position may be set to '1'. If the radio resource is not allocated to the AT, the corresponding bit position may be set to '0'.

In step 705, the BS may generate a resource allocation message including the generated bitmap. For example, as shown in Table 1 above, the resource allocation message may include at least one of a message SEQ number, an AT ID of an AT to be newly assigned, an NBAS used in a deallocation process, a bitmap bit start index for calculating a bit position of an AT newly assigned in the deallocation process, and an MCS level corresponding to the allocated radio resource. As such, when deallocation needs to be performed on the bitmap, the resource allocation message may include the NBAS. When a new bitmap is configured through the deallocation process, the BS may perform resource scheduling according to the new bitmap.

In step 707, the BS may code and modulate the resource allocation message according to a lowest MCS level among MCS levels of ATs that have to receive the resources allocation message. In step 709, the BS may transmit the coded and modulated resource allocation message to the AT.

Figure 8:
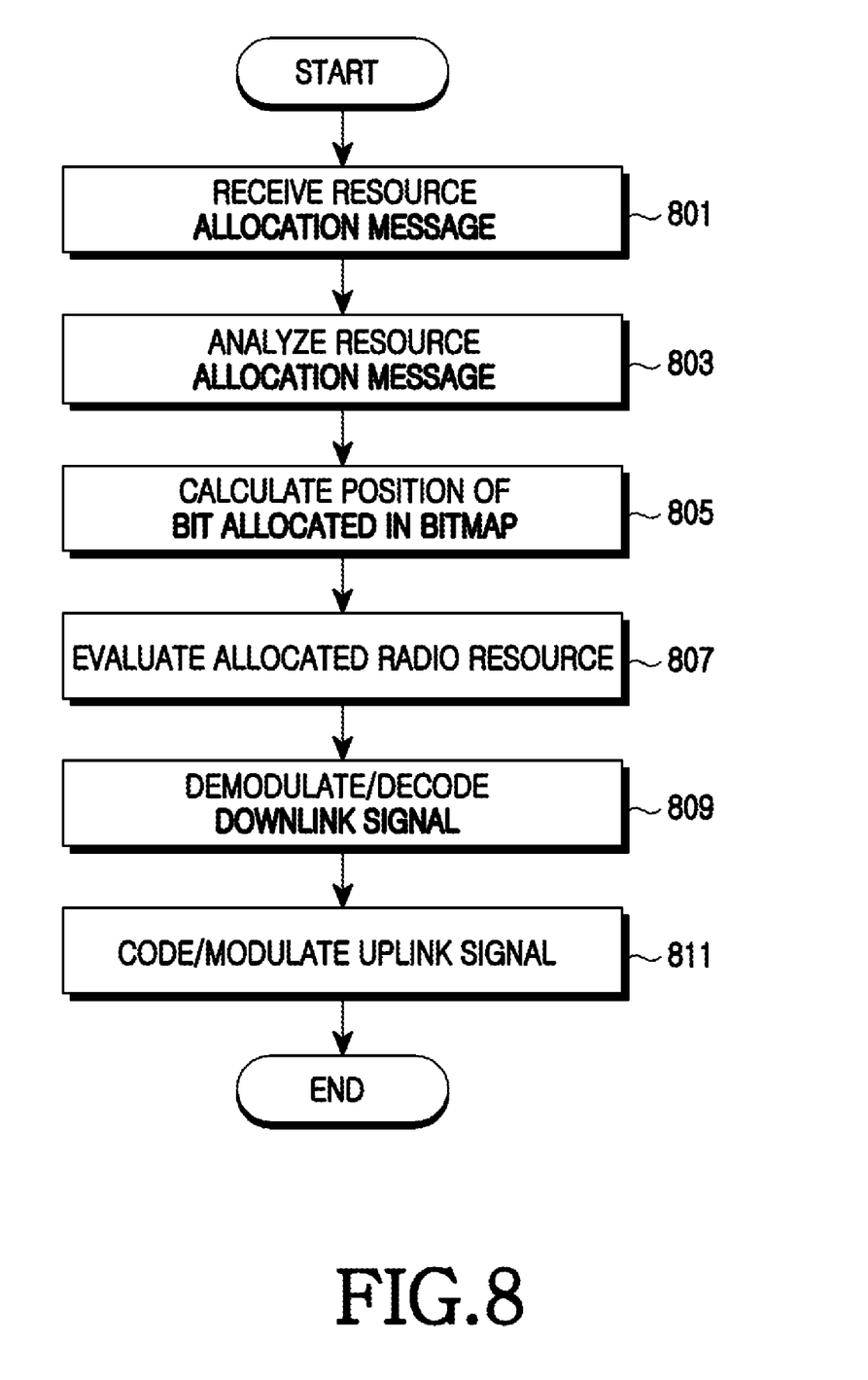
FIG. 8 is a flowchart illustrating an operation of an AT in a broadband wireless communication system according to an exemplary embodiment of the present invention.

FIG. 8 is a flowchart illustrating an operation of an AT in a broadband wireless communication system according to an exemplary embodiment of the present invention.

Referring to FIG. 8, the AT may receive from a BS a resource allocation message including a bitmap in step 801.

After receiving the resource allocation message, the AT may analyze the received resource allocation message in step 803. For example, as shown in Table 1 above, the resource allocation message may include at least one of a message SEQ number, an AT ID of an AT to be newly assigned, an NBAS used in a deallocation process, a bitmap bit start index for calculating a bit position of an AT newly assigned in the deallocation process, and an MCS level corresponding to the allocated radio resource.

In step 805, according to a result of analyzing the resource allocation message, the AT may determine whether a radio resource is allocated to the AT. For example, if a bit allocated to the AT is '1' in the bitmap included in the resource allocation message, it may be determined that the radio resource is allocated. If the resource allocation message includes the NBAS used in the deallocation process in a situation where the bit of the bitmap is allocated, the AT may determine whether there may be a bit allocated to the AT in a subsequent new bitmap. If there is no such bit, the AT may determine that the bit for the AT is deallocated in the new bitmap.

If the bit for the AT is '1' in the bitmap included in the resource allocation message, proceeding to step 807, the AT may evaluate an MCS level and a position of a radio resource corresponding to a bit position.

If a downlink radio resource is allocated, in step 809, the AT may convert a signal received using the downlink radio resource into a data bit-steam by performing demodulation and decoding according to a corresponding MCS level.

If an uplink radio resource is allocated, in step 811, the AT may code and modulates the data bit-stream to be transmitted according to a corresponding MCS level, and may then transmit the modulated data to the BS by using the allocated radio resource.

According to exemplary embodiments of the present invention, when a bitmap is used for resource allocation in a broadband wireless communication system, an operation of allocating (or deallocating) a bit of the bitmap to (or from) an AT may be promptly performed without using an additional radio resource. Therefore, overhead caused by resource allocation information may be decreased.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of operating a Base Station (BS) in a wireless communication system, the method comprising:
configuring a bitmap to indicate whether radio resources are allocated to respective Access Terminals (ATs) according to resource scheduling;
generating a resource allocation message comprising at least one of the configured bitmap, bit allocation information of the bitmap, and bit deallocation information of the bitmap; and
transmitting the resource allocation message,
wherein the resource allocation message comprises at least one of a message sequence number for indicating whether the bitmap has changed, a start position of radio resource allocation, an AT IDentifier (ID), a New Bit Allocation Sequence (NBAS) for indicating bitmap reconfiguration, a start index for calculating a bit position of a new bitmap, and a Modulation and Coding Scheme (MCS) level.

2. The method of claim 1, wherein the generating of the resource allocation message comprises, if there is a new AT requiring bit allocation of the bitmap, generating the resource allocation message comprising at least one of the AT ID of the new AT, the bitmap having a bit for the new AT, and the MCS level for a corresponding radio resource.

3. The method of claim 2, wherein the generating of the resource allocation message comprises configuring the new bitmap by adding N bits to an old bitmap if there are N new ATs requiring bit allocation of the bitmap, and wherein a bit for an $M^{th}$ AT among the N new ATs is determined to be an $M^{th}$ bit among bits of the added N bits.

4. The method of claim 1, wherein the generating of the resource allocation message comprises, if bit deallocation of the bitmap is necessary, generating the resource allocation message which comprises the NBAS for indicating bitmap reconfiguration and which comprises the bitmap.

5. The method of claim 4, wherein the generating of the resource allocation message further comprises increasing the NBAS whenever the resource allocation message is transmitted.

6. The method of claim 5, wherein, if the NBAS is '0', ATs whose bits are set to '1' in the bitmap are allocated with bits of the new bitmap, and the bit position of the new bitmap is determined according to an order of the bits which are set to '1' in the bitmap, and
wherein, if the NBAS is greater than or equal to '1', ATs whose bits are set to '1' in a current bitmap are allocated with the bits of the new bitmap, and the bit position of the new bitmap for each AT is determined according to the number of ATs previously allocated with the bits of the new bitmap and according to an order of bits which are set to '1' in the current bitmap.

7. The method of claim 1, wherein the generating of the resource allocation message comprises, if bits of the bitmap need to be deallocated and if the bits of the bitmap need to be allocated to a new AT, generating the resource allocation message comprising at least one of the AT ID of the new AT and a start index for calculating the bit position of the new bitmap to be used after a deallocation process is completed.

8. The method of claim 1, wherein the generating of the resource allocation message comprises, if a deallocation process is completely performed on bits of the bitmap, generating the resource allocation message comprising an incremented message sequence number and the new bitmap.

9. A method of operating an Access Terminal (AT) in a wireless communication system, the method comprising:
receiving a resource allocation message comprising at least one of a bitmap for indicating whether radio resources are allocated to respective ATs, bit allocation information of the bitmap, and bit deallocation information of the bitmap;
analyzing the resource allocation message; and
confirming a bit position for the AT in the bitmap included in the resource allocation message and determining whether to allocate the radio resources according to a setup value of the confirmed bit position,
wherein the resource allocation message comprises at least one of a message sequence number for indicating whether the bitmap has changed, a start position of radio resource allocation, an AT IDentifier (ID), a New Bit Allocation Sequence (NBAS) for indicating bitmap reconfiguration, a start index for calculating the bit position of a new bitmap, and a Modulation and Coding Scheme (MCS) level.

10. The method of claim 9, further comprising:
determining whether the AT ID of the AT is included in the resource allocation message;
if the AT ID is included, evaluating at least one of last bits of the bitmap according to a number of AT IDs included in the resource allocation message; and
determining whether to allocate the radio resources according to the setup value of the bit position for the AT among the at least one of last bits of the bitmap.

11. The method of claim 9, further comprising:
determining whether the NBAS is included in the resource allocation message;
if the NBAS is included, determining whether the NBAS is '0';
if the NBAS is '0', determining whether the bit position for the AT is set to '1' in the bitmap included in the resource allocation message; and
if the bit position is set to '1', determining the bit position for the AT in the new bitmap according to an order of bits having a value of '1' in the bitmap.

12. The method of claim 11, further comprising, if the bit position for the AT is set to '0', storing the NBAS and the bitmap.

13. The method of claim 12, further comprising, if the NBAS is greater than or equal to '1', determining the bit position for the AT in the new bitmap according to the number of ATs previously allocated with bits of the new bitmap and according to an order of bits which are set to '1' in the current bitmap.

14. The method of claim 9, further comprising:
evaluating whether the NBAS and the AT ID are included in the resource allocation message; and
if the NBAS and the AT ID are included, calculating the bit position for the new bitmap to be used after a deallocation process is completed by using start index information included in the resource allocation message.

15. The method of claim 9, further comprising:
determining whether an incremented message sequence number is included in the resource allocation message;
if the incremented message sequence number is included, evaluating the new bitmap included in the resource allocation message according to a previously calculated bit position; and
determining whether to allocate the radio resources according to the bit position in the new bitmap.

16. A Base Station (BS) apparatus for dynamic resource allocation in a wireless communication system, the apparatus comprising:
a resource allocator for allocating radio resources to respective Access Terminals (ATs) according to resource scheduling;
a message generator for generating at least one of a bitmap for indicating whether the radio resources are allocated to the respective ATs, bit allocation information of the bitmap, and bit deallocation information of the bitmap, according to a result of the resource scheduling; and
a transmitter for transmitting the resource allocation message,
wherein the resource allocation message comprises at least one of a message sequence number for indicating whether the bitmap has changed, a start position of radio resource allocation, an AT IDentifier (ID), a New Bit Allocation Sequence (NBAS) for indicating bitmap reconfiguration, a start index for calculating a bit position of a new bitmap, and a Modulation and Coding Scheme (MCS) level.

17. The apparatus of claim 16, wherein, if bits of the bitmap need to be deallocated, the message generator generates the resource allocation message including the bitmap and the NBAS for indicating bitmap reconfiguration, and
wherein the NBAS is incremented whenever the resource allocation message is transmitted.

18. The apparatus of claim 17, wherein, if the NBAS is '0', ATs whose bits are set to '1' in the bitmap are allocated with bits of the new bitmap, and the bit position of the new bitmap is determined according to an order of the bits which are set to '1' in the bitmap, and
wherein, if the NBAS is greater than or equal to '1', ATs whose bits are set to '1' in the current bitmap are allocated with the bits of the new bitmap, and the bit position of the new bitmap for each AT is determined according to the number of ATs previously allocated with the bits of the new bitmap and according to an order of bits which are set to '1' in the current bitmap.

19. The apparatus of claim 17, wherein, if a deallocation process is completely performed on the bits of the bitmap, the message generator generates a resource allocation message including an incremented message sequence number and the new bitmap.

20. An Access Terminal (AT) apparatus in a wireless communication system, the apparatus comprising:
a receiver for receiving a resource allocation message comprising at least one of a bitmap for indicating whether radio resources are allocated to respective ATs, bit allocation information of the bitmap, and bit deallocation information of the bitmap; and
a controller for analyzing the resource allocation message to confirm a bit position for the AT in the bitmap included in the resource allocation message and for determining whether to allocate the radio resources according to a setup value of the confirmed bit position,
wherein the resource allocation message comprises at least one of a message sequence number for indicating whether the bitmap has changed, a start position of radio resource allocation, an AT IDentifier (ID), a New Bit Allocation Sequence (NBAS) for indicating bitmap reconfiguration, a start index for calculating the bit position of a new bitmap, and a Modulation and Coding Scheme (MCS) level.

21. The apparatus of claim 20, wherein, if the resource allocation message comprises the NBAS that is '0', the controller determines whether the bit position for the AT is set to '1' in the bitmap included in the resource allocation message, and if the bit position is set to '1', determines the bit position for the AT in the new bitmap according to an order of bits having a value of '1' in the bitmap, and
wherein, if the NBAS is greater than or equal to '1', the controller determines the bit position for the AT in the new bitmap according to the number of ATs previously allocated with bits of the new bitmap and according to an order of bits which are set to '1' in the current bitmap.

* * * * *